(12) United States Patent
Jung

(10) Patent No.: US 11,046,300 B2
(45) Date of Patent: Jun. 29, 2021

(54) VEHICLE STEERING CONTROL METHOD

(71) Applicants: HYUNDAI MOTOR COMPANY, Seoul (KR); KIA MOTORS CORPORATION, Seoul (KR)

(72) Inventor: Dae Suk Jung, Gyeongsangnam-do (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 442 days.

(21) Appl. No.: 16/166,961

(22) Filed: Oct. 22, 2018

(65) Prior Publication Data

US 2019/0389448 A1 Dec. 26, 2019

(30) Foreign Application Priority Data

Jun. 21, 2018 (KR) .................. 10-2018-0071399

(51) Int. Cl.
*B60W 10/20* (2006.01)
*B60W 30/04* (2006.01)
*B60T 8/24* (2006.01)
*B60W 30/045* (2012.01)

(52) U.S. Cl.
CPC ............ *B60W 10/20* (2013.01); *B60T 8/243* (2013.01); *B60T 8/246* (2013.01); *B60W 30/04* (2013.01); *B60W 30/045* (2013.01)

(58) Field of Classification Search
None
See application file for complete search history.

(56) References Cited

U.S. PATENT DOCUMENTS

| 4,681,183 A | 7/1987 | Oshita |
| 4,834,203 A * | 5/1989 | Takahashi ............ B62D 5/0466 180/446 |
| 4,865,148 A | 9/1989 | Marumoto et al. |
| 5,172,319 A | 12/1992 | Shiraishi et al. |
| 5,255,192 A * | 10/1993 | Ito .......................... B60K 28/16 701/90 |

(Continued)

FOREIGN PATENT DOCUMENTS

| JP | 2007-038702 A | 2/2007 |
| JP | 2007-170274 A | 7/2007 |

(Continued)

OTHER PUBLICATIONS

Korean Office Action dated Jan. 20, 2021 from the corresponding Korean Application No. 10-2017-0038332, 4 pp.

*Primary Examiner* — Shelley Chen
(74) *Attorney, Agent, or Firm* — Brinks Gilson & Lione

(57) ABSTRACT

A method for a steering control of a vehicle to improve steering restoration when the vehicle escapes from a turn path via acceleration during high-speed turning. The vehicle steering control method includes determining whether or not a vehicle is rapidly accelerating in a high-speed turning state, and providing a restoration compensation torque in a vehicle steering restoration direction using a steering motor when it is determined that the vehicle is rapidly accelerating in the high-speed turning state. In particular, the restoration compensation torque is determined based on a relationship of a steering torque, a wheel speed, a number of revolutions of an engine, and a steering angular speed of the vehicle.

7 Claims, 4 Drawing Sheets

(56) References Cited

U.S. PATENT DOCUMENTS

| | | | |
|---|---|---|---|
| 5,388,658 A | 2/1995 | Ando et al. | |
| 5,601,346 A | 2/1997 | Lustenberger et al. | |
| 6,122,912 A | 9/2000 | Phillips | |
| 6,152,254 A | 11/2000 | Phillips | |
| 6,778,890 B2* | 8/2004 | Shimakage | B62D 1/286 180/443 |
| 7,565,946 B2* | 7/2009 | Suzumura | B62D 6/003 180/444 |
| 7,954,593 B2* | 6/2011 | Dornhege | B62D 5/0472 180/446 |
| 9,567,003 B2* | 2/2017 | Kageyama | B60W 10/196 |
| 2001/0027364 A1 | 10/2001 | Matsuoka | |
| 2002/0013647 A1* | 1/2002 | Kawazoe | B62D 1/28 701/41 |
| 2002/0045981 A1* | 4/2002 | Ichikawa | B60K 28/165 701/91 |
| 2002/0125063 A1 | 9/2002 | Kurishige et al. | |
| 2003/0078712 A1* | 4/2003 | Shimakage | B62D 15/025 701/41 |
| 2004/0064228 A1 | 4/2004 | Yamamoto et al. | |
| 2004/0102894 A1 | 5/2004 | Holler | |
| 2004/0167694 A1* | 8/2004 | Tamai | B62D 5/0472 701/41 |
| 2005/0057347 A1 | 3/2005 | Baader et al. | |
| 2005/0082107 A1* | 4/2005 | Husain | B62D 5/006 180/402 |
| 2005/0206235 A1 | 9/2005 | Tseng | |
| 2005/0247509 A1 | 11/2005 | Schneider et al. | |
| 2007/0062755 A1 | 3/2007 | Krieger et al. | |
| 2007/0095604 A1* | 5/2007 | Suzumura | B62D 6/003 180/446 |
| 2008/0015778 A1* | 1/2008 | Matsuura | G08G 1/167 701/301 |
| 2010/0131146 A1 | 5/2010 | Nardi et al. | |
| 2010/0131229 A1 | 5/2010 | Nardi et al. | |
| 2011/0022268 A1 | 1/2011 | Kojo | |
| 2011/0196568 A1 | 8/2011 | Nickolaou et al. | |
| 2011/0307129 A1 | 12/2011 | Yu et al. | |
| 2012/0083973 A1 | 4/2012 | Araki et al. | |
| 2012/0109483 A1 | 5/2012 | O'Dea et al. | |
| 2013/0073161 A1 | 3/2013 | Tsushima | |
| 2013/0131947 A1 | 5/2013 | Takahashi et al. | |
| 2014/0358370 A1 | 12/2014 | Kikuchi et al. | |
| 2015/0081170 A1 | 3/2015 | Kikuchi | |
| 2015/0158496 A1 | 6/2015 | Cassar et al. | |
| 2015/0158524 A1 | 6/2015 | Lee et al. | |
| 2015/0284022 A1 | 10/2015 | Kudo et al. | |
| 2015/0291210 A1* | 10/2015 | Kageyama | B62D 5/04 701/41 |
| 2016/0018821 A1 | 1/2016 | Akita et al. | |
| 2016/0159389 A1 | 6/2016 | Kuramitsu | |
| 2016/0318546 A1 | 11/2016 | Lee et al. | |
| 2017/0096166 A1 | 4/2017 | Kataoka et al. | |
| 2017/0113717 A1 | 4/2017 | Ko | |
| 2017/0183027 A1 | 6/2017 | Kimura et al. | |
| 2017/0210414 A1 | 7/2017 | Sato | |
| 2017/0297611 A1 | 10/2017 | Raad et al. | |
| 2017/0358963 A1 | 12/2017 | Lim et al. | |
| 2018/0119808 A1 | 5/2018 | Miller et al. | |
| 2018/0162395 A1 | 6/2018 | Mukai et al. | |
| 2018/0257631 A1 | 9/2018 | Fodor et al. | |
| 2018/0273086 A1 | 9/2018 | Jung | |
| 2018/0362075 A1* | 12/2018 | Lee | F16D 37/02 |
| 2019/0389448 A1 | 12/2019 | Jung | |

FOREIGN PATENT DOCUMENTS

| | | | |
|---|---|---|---|
| JP | 2008-273246 A | | 11/2008 |
| JP | 4420005 B2 * | | 2/2010 |
| JP | 4420005 B2 | | 2/2010 |
| JP | 2011-105082 A | | 6/2011 |
| JP | 2013-023018 A | | 2/2013 |
| JP | 2015-229385 A | | 12/2015 |
| JP | 5900643 B2 | | 4/2016 |
| JP | 2017-105424 A | | 6/2017 |
| KR | 10-2013-0030634 A | | 3/2013 |
| KR | 10-2013-0066116 A | | 6/2013 |
| KR | 10-2014-0025964 A | | 3/2014 |
| KR | 10-2017-0035559 A | | 3/2017 |

* cited by examiner

VEHICLE STEERING CONTROL METHOD

CROSS-REFERENCE TO RELATED APPLICATION

This application claims the priority to and the benefit of Korean Patent Application No. 10-2018-0071399, filed on Jun. 21, 2018, the entire contents of which are incorporated herein by reference.

FIELD

The present disclosure relates to a vehicle steering control method that improves steering performance and traveling stability of the vehicle.

BACKGROUND

The statements in this section merely provide background information related to the present disclosure and may not constitute prior art.

A high-performance vehicle, which employs a high-output engine and a high-grip tire, such as a racing vehicle, implements rapid acceleration traveling together with sharp left-turn and right-turn traveling, and therefore, raises a new problem in terms of steering operation.

That is, in such a high-performance vehicle, when the vehicle escapes from a turn path via rapid acceleration during high-speed turning, a lateral input load, which has a strong effect on steering restoration performance, is reduced due to tire characteristics.

The reduced lateral input load is not a problem when it is higher than the friction of a steering system. However, we have discovered that when the lateral input load is lower than the friction of the steering system, a tie rod restoration load may be reduced, and thus reaction for a steering wheel may disappear, which makes steering restoration inoperable.

Due to this, as illustrated in FIG. 1, the vehicle may not travel in a direction as the driver intends with the rapid acceleration, and an oversteer phenomenon may occur, or the vehicle may spin while sliding.

SUMMARY

The present disclosure provides a vehicle steering control method that improves steering restoration performance when a vehicle escapes from a turn path via acceleration during high-speed turning, thereby improving the steerability and traveling stability of the vehicle.

In accordance with an aspect of the present disclosure, a method for a steering control of a vehicle includes: determining, by a controller, whether or not a vehicle is rapidly accelerating in a high-speed turning state, and providing by the controller a restoration compensation torque in a vehicle steering restoration direction using a steering motor when the controller determines that the vehicle is rapidly accelerating in the high-speed turning state. In particular, the restoration compensation torque is determined by the controller based on a steering torque, a wheel speed, a number of revolutions of an engine, and a steering angular speed of the vehicle.

The high-speed turning state may be determined by the controller based on a vehicle speed, a steering angle, and a lateral acceleration of the vehicle, and whether or not the vehicle is rapidly accelerating may be determined based on the number of revolutions of the engine, a vehicle driving torque, an opening rate of an accelerator pedal, and a torque transferred to an outer wheel of the vehicle during turning.

The restoration compensation torque may be determined by multiplying a first compensation amount, which is determined by a difference between a target steering torque and a driver steering torque, a second compensation amount, which is determined based on an engine torque and a number of gear stages, and a third compensation amount, which is determined based on the steering angular speed and a vehicle speed.

The target steering torque may be determined based on the vehicle speed and the lateral acceleration of the vehicle.

The first compensation amount may be determined by subtracting the driver steering torque from the target steering torque, the second compensation amount may be determined by multiplying the estimated number of gear stages by a gear stage gain value and the engine torque, and the third compensation amount may be further determined by multiplying the steering angular speed by an angular speed gain value. In another form, the first compensation amount is set to zero "0" when the driver steering torque is equal to or greater than the target steering torque.

The number of gear stages may be estimated using the number of revolutions of the engine and a number of revolutions of drive wheels of the vehicle by calculating an average wheel speed of the drive wheels and calculating the number of revolutions of the drive-wheels using the average wheel speed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
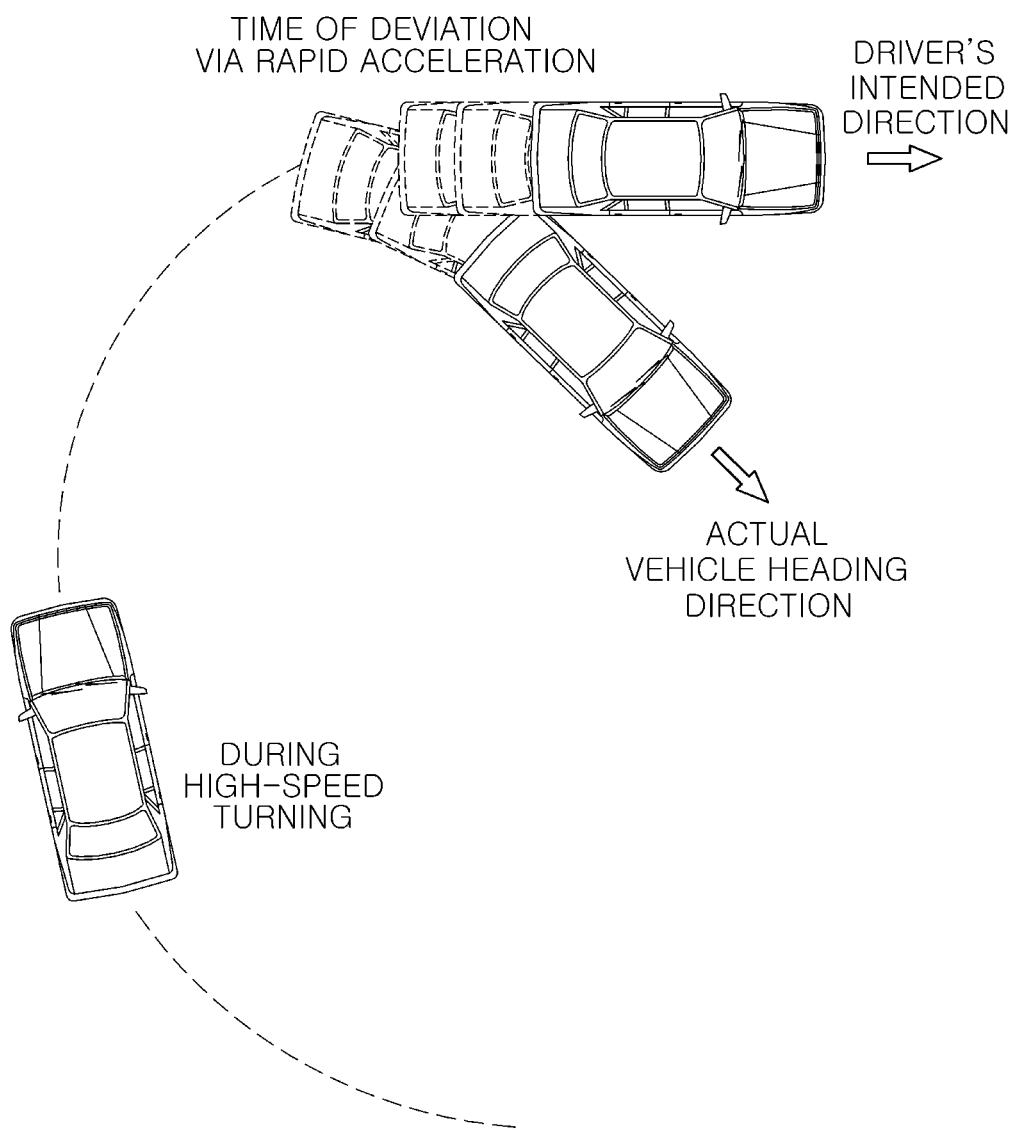
FIG. 1 is a view for explaining a problematic phenomenon attributable to unsatisfactory steering restoration when a vehicle escapes from a path via acceleration during high-speed turning.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A vehicle steering control method of the present disclosure includes a turning acceleration determination step and a compensation-torque providing step.

Figure 2:
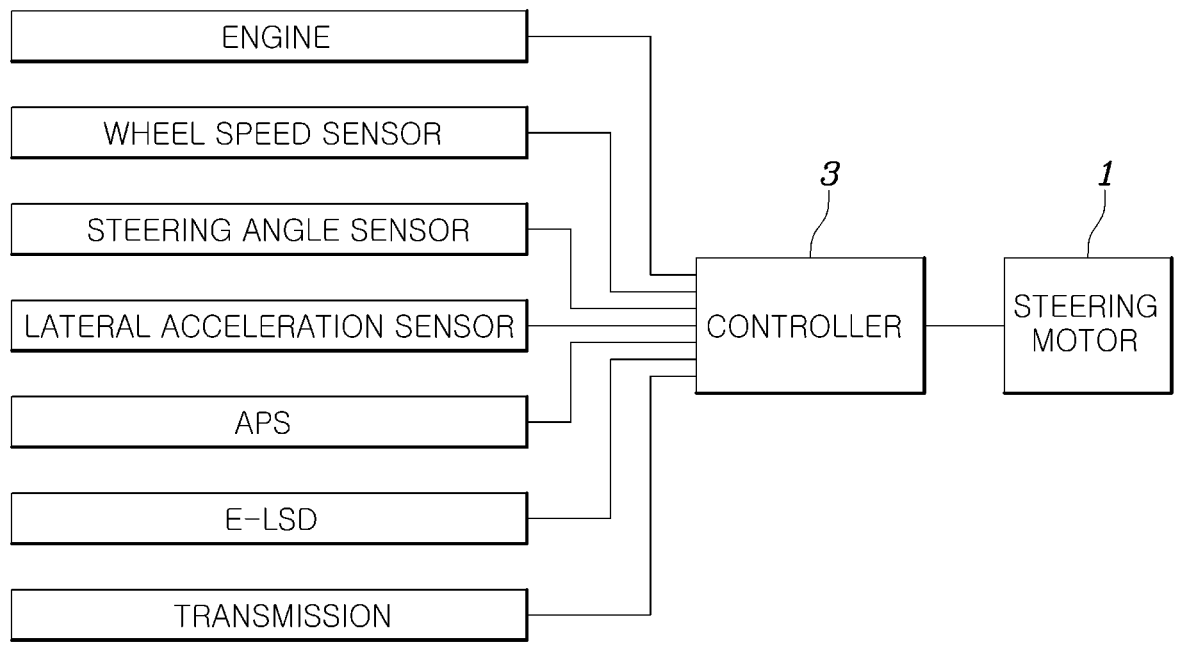
FIG. 2 is a view schematically illustrating the overall configuration of a steering system for steering control.
Figure 3:
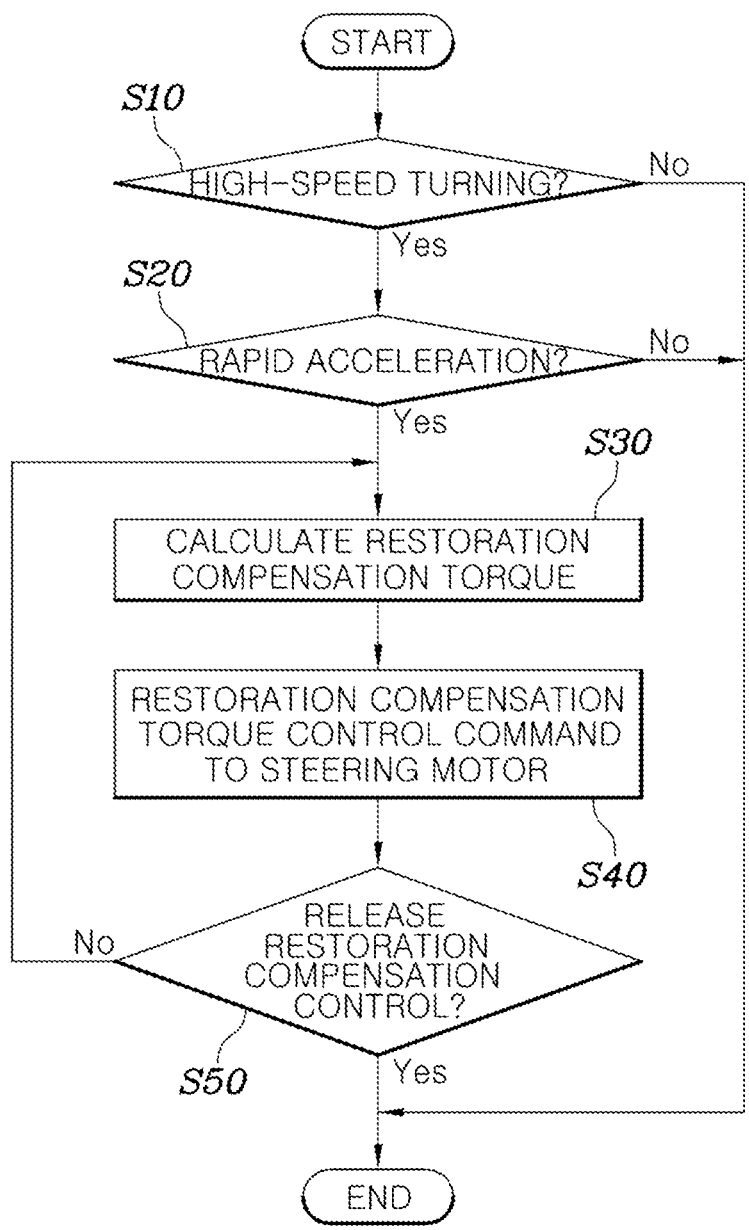
FIG. 3 is a view illustrating the control flow of a steering control method.

Referring to FIGS. 2 and 3, first, in the turning acceleration determination step, a controller 3 determines whether or not a vehicle is rapidly accelerating in a high-speed turning state.

The high-speed turning state of the vehicle may be determined based on the vehicle speed, the steering angle, and the lateral acceleration, which may be measured respectively by a vehicle speed sensor, a steering angle sensor, and a lateral acceleration sensor. The values measured via these sensors are input to the controller 3.

For example, when the vehicle speed is a predetermined vehicle value or more, when the absolute value of the steering angle is a predetermined value or more, or when the lateral acceleration is a predetermined value or more, the controller 3 may determine that the vehicle is currently performing a high-speed turn.

In addition, whether or not the vehicle is rapidly accelerating may be determined based on the number of revolutions of an engine, the vehicle driving torque, the opening rate of an accelerator pedal, and a torque transferred to an outer wheel during turning.

Among these, the vehicle driving torque may be determined by "Engine Torque×Gain for Number of Gear Stage", the opening rate of the accelerator pedal may be measured via an accelerator pedal sensor (APS), and the torque transferred to the outer wheel during turning may be obtained via an electronic limited slip differential (E-LSD) device.

For example, when the number of revolutions of the engine is a predetermined value or more, when the vehicle driving torque is a predetermined value or more, when the opening rate of the accelerator pedal is a predetermined value or more, or when the torque transferred to the outer wheel during turning is a predetermined value or more, the controller 3 may determine that the vehicle is rapidly accelerating during high-speed turning.

In the compensation-torque providing step, when it is determined that the vehicle is rapidly accelerating during high-speed turning, the controller 3 may provide a restoration compensation torque in a vehicle steering restoration direction using a steering motor 1. The restoration compensation torque may be determined based on the relationship of the steering torque, the wheel speed, the number of revolutions of the engine, and the steering angular speed.

For example, the present disclosure is suitable for a vehicle equipped with a motor-driven power steering (MDPS) system that supplements driver steering force using drive power of an electric motor. The steering motor 1 may be the motor used in the MDPS system.

That is, according to the configuration described above, when the vehicle escapes from a turn path via rapid acceleration during high-speed turning, by providing a compensation torque in the direction opposite to the direction in which the vehicle currently turns, i.e. in the vehicle steering restoration direction using the steering motor 1, the steering restoration performance of the vehicle is improved, which improves the steerability and traveling stability of the vehicle.

Figure 4:
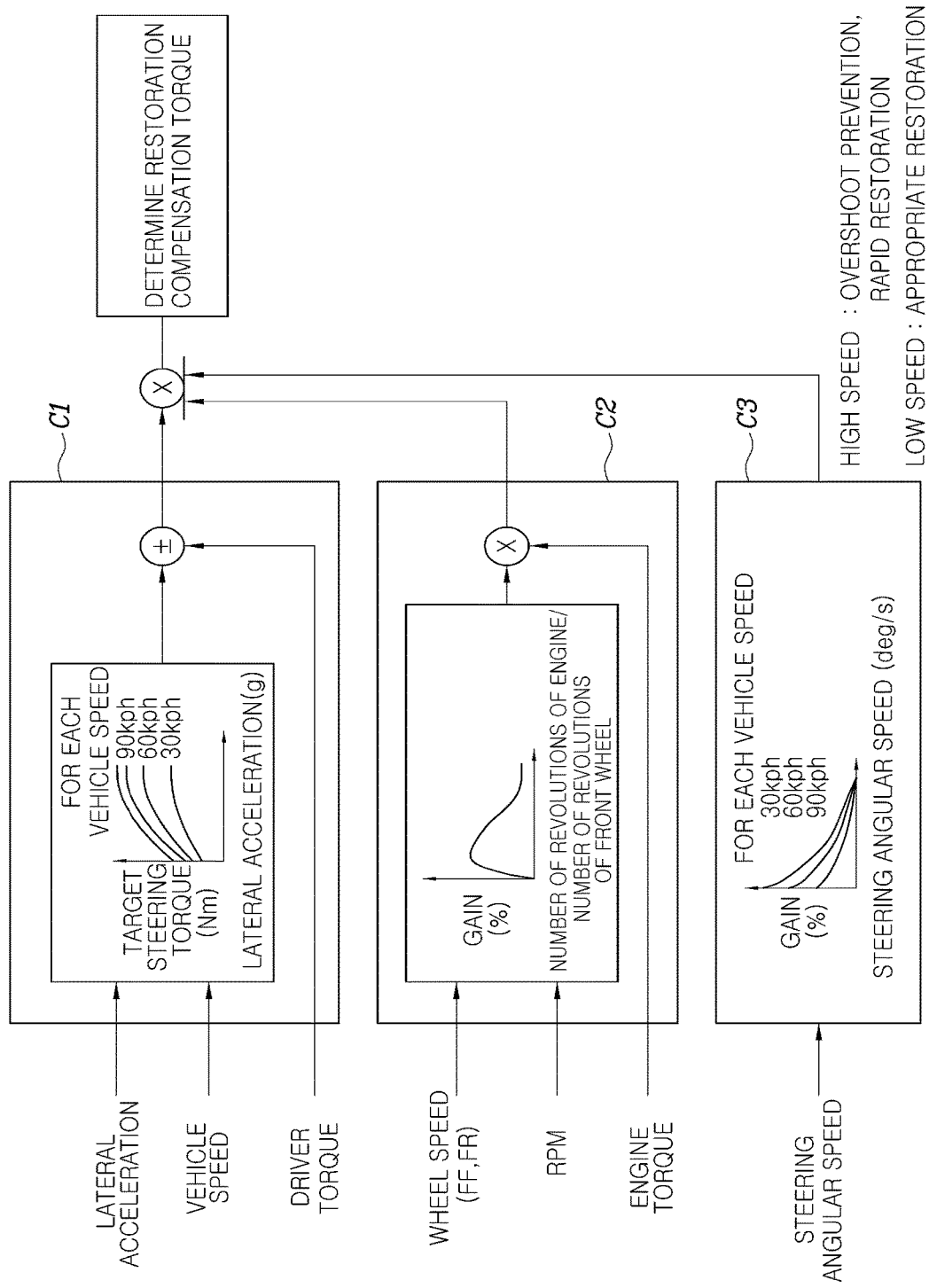
FIG. 4 is a view for explaining a method of calculating a restoration compensation torque.

The method of determining the restoration compensation torque will be described in more detail with reference to FIG. 4. The restoration compensation torque is determined by multiplying a first compensation amount C1, a second compensation amount C2, and a third compensation amount C3, which will be described below.

First, the first compensation amount C1 is determined by a difference between a driver steering torque and a target steering torque, which is determined from the relationship of the vehicle speed and the lateral acceleration. When the target steering torque is greater than the driver steering torque, the first compensation amount C1 is determined by the difference there between.

For example, when the target steering torque is determined based on the vehicle speed and the lateral acceleration, a comparison between the target steering torque and the driver steering torque is made.

When the comparison result is that the driver steering torque is equal to or greater than the target steering torque, the first compensation amount C1 is determined to be "0":

Driver Steering Torque≥Target Steering Torque, and

First Compensation Amount=0.

On the other hand, when the target steering torque is greater than the driver steering torque, the first compensation amount C1 is determined by subtracting the driver steering torque from the target steering torque:

Driver Steering Torque≥Target steering torque, and

First Compensation Amount=Target Steering Torque−Driver Steering Torque.

That is, the amount of assistance of the motor is controlled in order to match the driver steering torque, sensed by the driver, to the target steering torque.

Explained further, although the first compensation amount, which is a basic compensation amount, has conventionally been determined based on only the vehicle speed and the steering angle, in the present disclosure, the first compensation amount C1, which is a basic compensation amount, is determined using the vehicle speed and the lateral acceleration, whereby uniform steering may be achieved and the tuning time may be reduced even when any external factor (suspension geometry) is changed.

In addition, the second compensation amount C2 is determined based on the engine torque and the number of gear stages which is estimated by the driving wheel speed and the number of revolutions of the engine. The second compensation amount C2 is determined by multiplying the estimated number of gear stages by a gear stage gain value and then multiplying the resulting value by the engine torque.

Here, the gear stage gain value may be set in a manner such that it increases to a specific low gear stage, but decreases from a gear stage exceeding the specific low gear stage, so that the compensation amount may increase or decrease for each gear stage:

0≤Gear Stage Gain Value≤1.

Describing the method of estimating the number of gear stages in more detail, for example, in the case of a front-wheel-drive vehicle, the average wheel speed of two front wheels, which are the drive wheels, is calculated as follows:

$$v_{avg} = \frac{v_{FL} + v_{FR}}{2}$$

here, $V_{avg}$: Average Front Wheel Speed,
$V_{FL}$: Left Front Wheel Speed, and
$V_{FR}$: Right Front Wheel Speed.

Then, the average number of revolutions of the front wheels, which are the drive wheels are, calculated using the average wheel speed as follows:

$$N_{wheel} = \frac{v_{avg}}{2\pi R}$$

$$v_{avg} = 2\pi R N_{wheel}$$

here, $N_{wheel}$: Average Number of Revolutions of Drive Wheel (Front Wheel), and R: Rolling Radius.

Subsequently, the number of gear stages is calculated and estimated using the number of revolutions of the drive wheels and the number of revolutions of the engine as follows:

$$\text{Estimated Number of Gear Stage} = \frac{N_{RPM}}{N_{wheel}}$$

here, $N_{RPM}$: Number of Revolutions of Engine.

Specifically, since the number of gear stages has conventionally been determined using the engine torque and the position of the transmission, a transmission position signal may be intermittently delayed, or no signal may be generated in a semi-clutch state. On the other hand, in the present disclosure, by calculating the number of gear stages using the number of revolutions of the engine without using the position of the transmission, the second compensation amount C2, which is an acceleration condition compensation amount, may be stably determined even in the case of signal delay and signal non-delivery depending on the delay of the transmission position signal.

In addition, the third compensation amount C3 is determined based on the steering angular speed and the vehicle speed, and is determined by multiplying the steering angular speed by an angular speed gain value.

Here, since the angular speed gain value decreases as the steering angular speed increases, the angular speed gain value may be controlled so as to reduce the amount of restoration:

0≤Angular Speed Gain Value≤1.

That is, when the driver releases his/her hand from the handle (hands-off), or when it is desired to prevent an overshoot state (the case in which the wheel deviates from the center of a path due to excessive torque in the vehicle steering restoration direction), a compensation amount is determined by a gain value for each steering angular speed. In addition to additionally securing optimum performance for each vehicle speed, different compensation amounts may be determined for each vehicle speed.

As illustrated in FIG. 3, after the compensation-torque providing step, the vehicle steering control method may further include a high-speed turning release determination step of determining whether or not the vehicle is out of the high-speed turning state, and a compensation torque release step of releasing the provision of the restoration compensation torque when the vehicle is out of the high-speed turning state.

Whether or not the vehicle is out of the high-speed turning state may be determined based on any one of the vehicle speed, the steering angle, the vehicle driving torque, and the torque transferred to the outer wheel during turning. When any one of these factors satisfies a release condition, the provision of the restoration compensation torque is released.

For example, when the vehicle speed is below a predetermined value, when the absolute value of the steering angle is below a predetermined value, when the vehicle driving torque is below a predetermined value, or when the torque transferred to the outer wheel during turning is below a predetermined value, the controller 3 may determine that the vehicle is currently out of the high-speed turning state.

It is to be noted that, by adopting a hysteresis error between an output value, at which all of the vehicle speed, the steering angle, the vehicle driving torque, and the torque transferred to the outer wheel during turning correspond to a restoration compensation torque entry condition, and an output value at which all of the vehicle speed, the steering angle, the vehicle driving torque, and the torque transferred to the outer wheel during turning correspond to a restoration compensation torque release condition, it is possible to inhibit or prevent the entry and release of the restoration compensation torque from being repeatedly performed at the boundaries of the output values.

Hereinafter, the control flow of the steering control method in one form of the present disclosure will be described.

Referring to FIG. 3, while the vehicle is traveling, the controller 3 receives the vehicle speed, the steering angle, and the lateral acceleration from various sensors mounted in the vehicle, and determines based on these values whether or not the vehicle is performing high-speed turn (S10).

When the determined result of step S10 is that the vehicle is performing a high-speed turn, the controller 3 receives the number of revolutions of the engine, the vehicle driving torque, the opening rate of the accelerator pedal, and the torque transferred to the outer wheel during turning, and determines based on these values whether or not the vehicle is currently rapidly accelerating (S20).

When the determined result of step S20 is that the vehicle is currently rapidly accelerating, the controller 3 determines that a compensation entry condition is satisfied and calculates a restoration compensation torque to be provided in the vehicle steering restoration direction based on the relationship of the steering torque, the wheel speed, the number of revolutions of the engine, and the steering angular speed (S30).

Subsequently, the controller 3 controls the operation of the steering motor 1 so as to provide the restoration compensation torque calculated in step S30 in the vehicle steering restoration direction (S40). That is, the steering motor 1 is operated to provide the restoration compensation torque in the vehicle steering restoration direction.

Then, in step S40, the controller 3 receives the vehicle speed, the steering angle, the vehicle driving torque, and the torque transferred to the outer wheel during turning, and determines whether or not any one of these factors falls below a predetermined value (S50). When the determined result is that any one value falls below the predetermined value, the controller 3 determines that a compensation release condition is satisfied, and releases the provision of the restoration compensation torque.

As is apparent from the above description, according to the exemplary forms of present disclosure, when the vehicle escapes from a turn path via rapid acceleration during high-speed turning, by providing the compensation torque in the vehicle steering restoration direction using the steering motor 1 of the MDPS system, it is possible to improve the steering restoration performance of the vehicle. This may improve the steerability and traveling stability of the vehicle, and in particular, any possible problem may be solved with simplified MDPS logic, which may considerably reduce costs.

Further, in one form of the present disclosure, by determining the first compensation amount C1, which is a basic compensation amount, using the vehicle speed and the lateral acceleration, even if suspension characteristics (the road surface and the wheel center kingpin offset) are changed, it is possible to secure uniform steering and to reduce the tuning time.

Furthermore, by calculating the number of gear stages using the number of revolutions of the engine in order to determine the second compensation amount C2, which is an acceleration condition compensation amount, it is possible to stably determine the compensation amount even in the case of signal delay and signal non-delivery depending on the delay of a transmission position signal.

In addition, by adding a gain for each vehicle speed and each steering angular speed in order to determine the third compensation amount C3 for preventing a hands-off or overshoot state, it is possible to secure optimum steering sense and restoration performance.

Although the exemplary forms of the present disclosure have been described above with reference to the accompanying drawings, those skilled in the art will appreciate that the present disclosure can be implemented in various other forms without changing the technical ideas or features thereof.

What is claimed is:

1. A method for a steering control of a vehicle, the method comprising:
   determining, by a controller, whether or not a vehicle is rapidly accelerating in a high-speed turning state; and
   providing, by the controller, a restoration compensation torque in a vehicle steering restoration direction using a steering motor when the controller determines that the vehicle is rapidly accelerating in the high-speed turning state,
   wherein the restoration compensation torque is determined by the controller based on a steering torque, a wheel speed, a number of revolutions of an engine, and a steering angular speed of the vehicle.

2. The method according to claim 1, wherein the high-speed turning state is determined by the controller based on a vehicle speed, a steering angle, and a lateral acceleration of the vehicle, and wherein whether or not the vehicle is rapidly accelerating is determined based on the number of revolutions of the engine, a vehicle driving torque, an opening rate of an accelerator pedal, and a torque transferred to an outer wheel of the vehicle during turning.

3. The method according to claim 1, wherein the restoration compensation torque is determined by multiplying a first compensation amount, which is determined by a difference between a target steering torque and a driver steering torque, a second compensation amount, which is determined based on an engine torque and a number of gear stages, and a third compensation amount, which is determined based on the steering angular speed and a vehicle speed.

4. The method according to claim 3, wherein the target steering torque is determined based on the vehicle speed and a lateral acceleration of the vehicle.

5. The method according to claim 3, wherein the first compensation amount is determined by subtracting the driver steering torque from the target steering torque,
   wherein the second compensation amount is determined by multiplying the estimated number of gear stages by a gear stage gain value and the engine torque, and
   wherein the third compensation amount is further determined by multiplying the steering angular speed by an angular speed gain value.

6. The method according to claim 5, wherein when the driver steering torque is equal to or greater than the target steering torque, the first compensation amount is set to zero "0".

7. The method according to claim 3, wherein the number of gear stages is estimated using the number of revolutions of the engine and a number of revolutions of drive wheels of the vehicle by calculating an average wheel speed of the drive wheels and calculating the number of revolutions of the drive-wheels using the average wheel speed.

\* \* \* \* \*